United States Patent
Azam et al.

(10) Patent No.: US 9,430,263 B2
(45) Date of Patent: Aug. 30, 2016

(54) SHARING INTERNET CAPABILITY OF A MOBILE COMPUTING DEVICE WITH A CLIENT COMPUTING DEVICE USING A VIRTUAL MACHINE

(75) Inventors: Syed Azam, Tomball, TX (US); Chi W. So, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 14/000,572

(22) PCT Filed: Mar. 18, 2011

(86) PCT No.: PCT/US2011/028993
§ 371 (c)(1),
(2), (4) Date: Aug. 20, 2013

(87) PCT Pub. No.: WO2012/128744
PCT Pub. Date: Sep. 27, 2012

(65) Prior Publication Data
US 2013/0339957 A1    Dec. 19, 2013

(51) Int. Cl.
*G06F 9/455* (2006.01)
*G06F 9/54* (2006.01)

(52) U.S. Cl.
CPC ........ *G06F 9/45545* (2013.01); *G06F 9/45558* (2013.01); *G06F 9/54* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,191,211 B2* | 3/2007 | Tuli | H04L 69/329 707/E17.121 |
| 7,292,588 B2* | 11/2007 | Milley | H04M 1/7253 345/2.3 |
| 7,818,559 B2 | 10/2010 | Sadovsky et al. | |
| 8,392,497 B2* | 3/2013 | Vilke et al. | 709/202 |
| 8,397,242 B1* | 3/2013 | Conover | 719/313 |
| 8,601,129 B2* | 12/2013 | Burckart et al. | 709/226 |
| 8,676,949 B2* | 3/2014 | Vilke et al. | 709/223 |
| 8,799,477 B2* | 8/2014 | Burckart et al. | 709/226 |
| 2004/0205772 A1 | 10/2004 | Uszok et al. | |

(Continued)

FOREIGN PATENT DOCUMENTS

| | | |
|---|---|---|
| CN | 1628450 A | 6/2005 |
| CN | 1695375 A | 11/2005 |

(Continued)

OTHER PUBLICATIONS

Pan et al. "Executing MPI Programs on Virtual Machines in an Internet Sharing System", 2006 IEEE, 10 pages.*

(Continued)

*Primary Examiner* — Van Nguyen
(74) *Attorney, Agent, or Firm* — HP Inc Patent Department (57) ABSTRACT

Example embodiments relate to use of a virtual machine image for sharing Internet access available to a mobile computing device. In example embodiments, a virtual machine image maintained on a storage device of a mobile computing device is received in a client computing device. A guest operating system (OS) contained in the virtual machine image may then be executed on the client computing device. Network data may then be exchanged between the guest OS and the mobile computing device over an interface between the client computing device and the mobile computing device.

14 Claims, 5 Drawing Sheets

(56) References Cited

U.S. PATENT DOCUMENTS

| | | |
|---|---|---|
| 2007/0179955 A1 | 8/2007 | Croft et al. |
| 2008/0168188 A1 | 7/2008 | Yue et al. |
| 2009/0276771 A1 | 11/2009 | Nickolov et al. |
| 2010/0146504 A1 | 6/2010 | Tang |
| 2010/0190522 A1 | 7/2010 | Orlassino |
| 2010/0248698 A1 | 9/2010 | In et al. |
| 2010/0306773 A1 | 12/2010 | Lee et al. |
| 2010/0312919 A1 | 12/2010 | Lee et al. |

FOREIGN PATENT DOCUMENTS

| | | |
|---|---|---|
| CN | 1879434 A | 12/2006 |
| CN | 101425021 | 5/2009 |
| CN | 101667144 A | 3/2010 |
| CN | 101710290 | 5/2010 |
| CN | 101888401 A | 11/2010 |
| WO | WO-2008069480 | 6/2008 |

OTHER PUBLICATIONS

Khan et al. "Network Virtualization: A Hypervisor for the Internet?", 2012 IEEE, pp. 136-143.*

Sharma; Ashish: Cool-tether: energy efficient on-the-fly wifi hotspots using mobile phones, In: Proceedings ~ CoNEXT'09. ACM, 2009. pp. 109-120.

* cited by examiner

SHARING INTERNET CAPABILITY OF A MOBILE COMPUTING DEVICE WITH A CLIENT COMPUTING DEVICE USING A VIRTUAL MACHINE

BACKGROUND

With the rapid development of mobile devices, such as cell phones, wireless email devices, and tablet computers, users now have access to devices with significant computing power and storage capability in any physical location. In addition, given the near-global presence of cellular and other wireless networks, users can also use these mobile devices to readily access the Internet from nearly any physical location.

BRIEF DESCRIPTION OF THE DRAWINGS

The following detailed description references the drawings, wherein.

DETAILED DESCRIPTION

As detailed above, many mobile computing devices provide significant storage and computing capabilities, while also providing network access to the user regardless of his or her location. Although mobile devices are very convenient, most users also access devices other than their mobile devices, such as desktop or notebook computers. Unfortunately, desktops, notebooks, and other similar devices are generally preconfigured to run a particular operating system (OS) and a predetermined set of applications. As a result, the user is generally required to manually customize each desktop or notebook he or she uses. Furthermore, in some situations, the user may be unable to customize the computing device if, for example, the device is in a public location, such as a library or workplace. In addition, depending on its location, the desktop, notebook, or other similar device may lack access to the Internet.

To address these issues, example embodiments disclosed herein allow a user to harness the capabilities of a mobile device to create an Internet-connected, customizable computing environment on a client computing device, even when the client device lacks native networking capabilities. For example, in some embodiments, a user may store a virtual machine image on a storage medium contained in a mobile computing device. The user may then couple the mobile computing device to a target client computing device using a given interface, which may be wired or wireless. In response, the client computing may receive the virtual machine over the interface and load a guest operating system contained in the virtual machine image. After initiating the guest OS, the client computing device may then exchange network data with the mobile computing device over the interface, utilizing a network interface included in the mobile computing device to obtain Internet access.

In this manner, example embodiments disclosed herein allow a user to transport a customized virtual machine image on his or her mobile computing device. Since the user may than access this custom environment on any client device implementing functionality described herein, the user can avoid traveling with a notebook computer or other bulky device and can also minimize the need to customize each client device he or she accesses. Furthermore, example embodiments enable a user to easily gain secure network access on the client computing device using the mobile device, thereby providing network access on the client even when the client lacks native networking capabilities. Additional embodiments and advantages of such embodiments will be apparent to those of skill in the art upon reading and understanding the following description.

Figure 1:
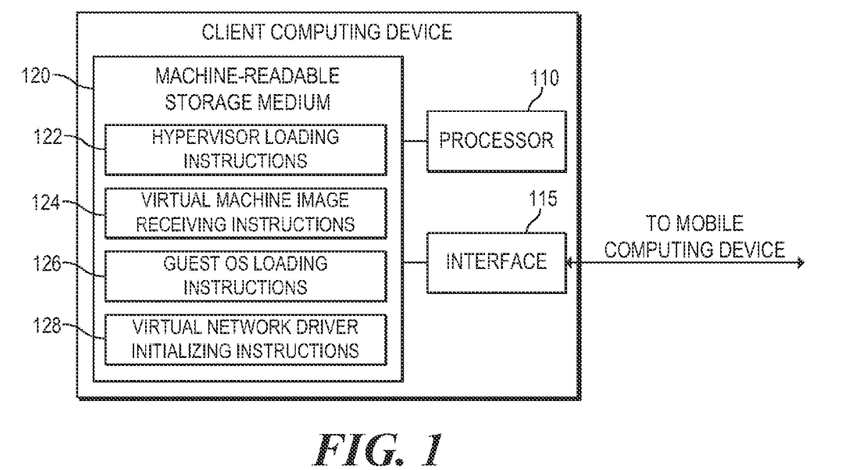
FIG. 1 is a block diagram of an example client computing device for sharing Internet access available to a mobile computing device.

Referring now to the drawings, FIG. 1 is a block diagram of an example client computing device 100 for sharing Internet access available to a mobile computing device. Client computing device 100 may be, for example, a notebook computer, a desktop computer, an all-in-one system, a workstation, a tablet computing device, or any other computing device suitable for execution of the functionality described below. In the implementation of FIG. 1, client computing device 100 includes processor 110, interface 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for sharing Internet access available to a mobile computing device, as described below. As an alternative or in addition to retrieving and executing instructions, processor 110 may include one or more electronic circuits that include a number of electronic components for performing the functionality of one or more of instructions 122, 124, 126, 128.

Interface 115 may include a number of electronic components for communicating with a mobile computing device. For example, interface 115 may be a Universal Serial Bus (USB) interface, an IEEE 1394 (Firewire) interface, an external Serial Advanced Technology Attachment (eSATA) interface, or any other physical connection interface suitable for communication with the mobile computing device. Alternatively, interface 115 may be a wireless interface, such as a wireless local area network (WLAN) interface or a near-field communication (NFC) interface. In operation, as detailed below, interface 115 may be used to send and receive data, such as a hypervisor, a virtual machine image, and network data, to and from a corresponding interface of a mobile computing device.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for sharing Internet access available to a mobile computing device using a hypervisor and a guest operating system.

Hypervisor loading instructions 122 may be configured to load a hypervisor (also known as a virtual machine monitor) on client computing device 100. For example, the hypervisor may be a commercially-available hypervisor, such as the Xen® hypervisor, Microsoft Hyper-V®, Parallels Desktop®, VMware vSphere®, and the like. Alternatively, the hypervisor may be a custom-developed hypervisor.

In some embodiments, the hypervisor may be maintained locally on client computing device 100, such that instructions 122 may load the hypervisor into memory from a local storage device. In other embodiments, client computing device 100 may instead read the hypervisor from a storage device of the mobile computing device using interface 115 and then load the hypervisor into memory. Depending on the implementation, the hypervisor loaded by instructions 122 may be either a Type 1 hypervisor or a Type 2 hypervisor. Example implementations using each type of hypervisor are detailed below in connection with FIGS. 2A and 2B, respectively.

Regardless of the particular implementation, once running on computing device 100, the hypervisor provides an environment that permits one or more guest operating systems to execute on computing device 100. For example, the hypervisor may provide an operating platform that permits each guest OS to request virtual hardware resources that are virtualized by the hypervisor. The hypervisor may then allocate hardware resources to each requesting guest OS. Thus, as detailed below, the executing hypervisor may host the guest OS received by receiving instructions 124 and loaded by loading instructions 126.

Virtual machine image receiving instructions 124 may receive a virtual machine image maintained on a storage device of the mobile computing device over interface 115. The received virtual machine image may be a file or a set of files that specify attributes of an emulated computing device, such as a processor architecture, a number of processors, an amount of storage space, an amount of memory, boot properties, etc. In some implementations, additional attributes may be specified in a set of one or more configuration files.

The virtual machine image may also include a guest operating system and, in some implementations, one or more applications for execution within the OS. The guest OS included in the virtual machine image may be any operating system that is installed in a virtual machine and executable by client computing device 100. For example, in some embodiments, the received virtual machine image may include a full-featured, preconfigured operating system and a number of applications that are capable of being executed within the OS. As another example, the virtual machine image may be a virtual application image (also known as a virtual appliance), such that the image includes a stripped-down OS with an application suitable for execution within the stripped-down OS.

After receipt of the virtual machine image, guest OS loading instructions 126 may load the guest OS contained in the virtual machine image for execution on client computing device 100. For example, computing device 100 may load the guest OS into main memory and begin execution of the OS within the hypervisor loaded by instructions 122. The hypervisor may then communicate with the loaded guest OS to allocate resources to the guest OS as they are requested by the guest OS.

During operation of the loaded guest OS, the guest OS or applications executing within the guest OS may generate network data for transmission or, alternatively, receive network data from an external source. In order to exchange such network data with the mobile computing device over interface 115, virtual network driver initializing instructions 128 may initialize a virtual network driver that virtualizes network hardware contained in the mobile computing device. Once initialized, the virtual network driver may exchange network data between the guest OS executing on computing device 100 and the network hardware of the mobile computing device coupled to client computing device 100. In this manner, computing device 100 may utilize the Internet access available to the mobile computing device by simply initializing the guest OS contained in the received virtual image, loading the driver, and subsequently exchanging network data using the driver.

The location of the virtual network driver may vary depending on the particular implementation. For example, in some embodiments, the virtual network driver may execute within the guest operating system. In other embodiments, the virtual network driver may execute within the hypervisor. In still other embodiments, the virtual network driver may execute within the host operating system of client computing device 100 (assuming that the hypervisor is a Type 2 hypervisor). The initialization and operation of the driver in such embodiments is described further below in connection with FIGS. 2A and 2B.

Regardless of its location, once loaded and initialized, the virtual network driver exchanges data with the network hardware of the mobile computing device using interface 115. Thus, when transmitting data originating in the guest OS to a destination on the Internet, the driver may transmit the data over interface 115 from client computing device 100 to the mobile device. Conversely, when receiving network data intended for the guest OS from a source on the Internet, the driver may receive the data over interface 115 from the mobile device to client computing device 100.

Thus, in operation, client computing device 100 allows a user to quickly load and execute a virtual machine image and to provision Internet access to device 100 via the guest OS contained in the virtual machine image. In particular, after coupling client computing device 100 to the mobile device using interface 115, the user may receive the virtual machine image, execute the guest OS, and subsequently utilize the network hardware of the mobile computing device to gain access to the Internet.

Figure 2A:
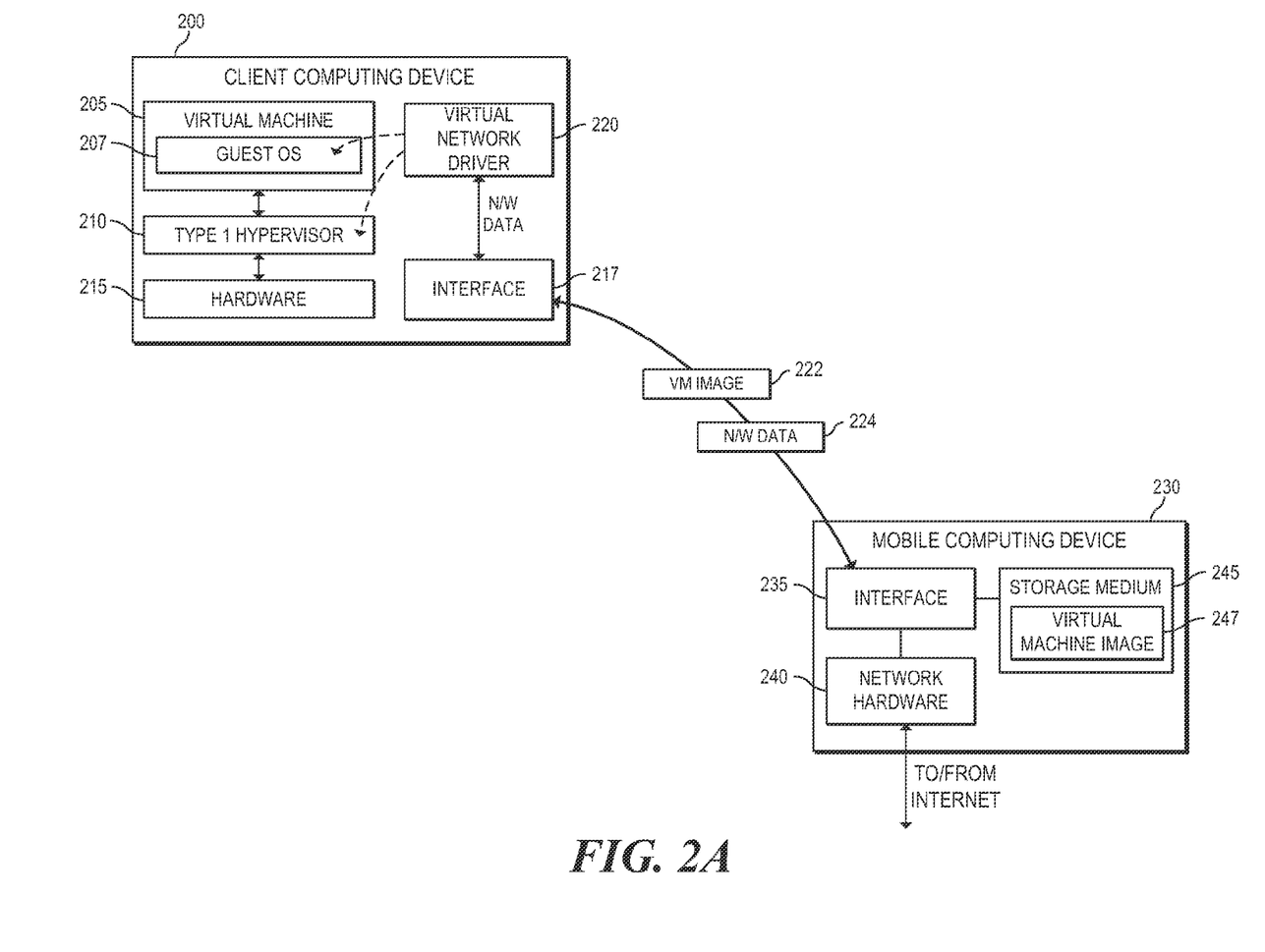
FIG. 2A is a block diagram of an example client computing device executing a Type 1 hypervisor and sharing Internet access available to a coupled mobile computing device.

FIG. 2A is a block diagram of an example client computing device 200 executing a Type 1 hypervisor 210 and sharing Internet access available to a coupled mobile computing device 230. As detailed below, client computing device 200 may be in communication with mobile computing device 230 for receiving a virtual machine image 222 and exchanging network data 224.

As illustrated, client computing device 200 may include a virtual machine 205, a guest OS 207, a Type 1 hypervisor 210, hardware 215, an interface 217, and a virtual network driver 220. In some implementations, virtual machine 205, guest OS 207, hypervisor 210, and virtual network driver 220 may be implemented as a series of instructions encoded on a storage medium and executed by hardware 215 of client computing device 200. For example, these components may be executed from Random Access Memory (RAM) by a processor included in hardware 215 that is similar to processor 110 of FIG. 1.

In operation, Type 1 hypervisor 210 may first be initialized on client computing device 200. Because hypervisor 210 is of "Type 1," hypervisor 210 may directly execute on hardware 215 of computing device 200 in the absence of an underlying host operating system. For example, Type 1 hypervisor 210 may initially be retrieved from a local storage device included in hardware 215 and loaded during a boot sequence of computing device 200. Once loaded, hypervisor 210 may be configured to allocate resources of hardware 215 to virtual machines communicating with the hypervisor 210, such as virtual machine 205.

In order to load virtual machine 205, client computing device 200 may initially receive the virtual machine image 222 via communication between interface 217 and interface 235. For example, when the user establishes a wired or wireless connection between interface 217 and interface 235, hypervisor 210 may automatically detect the connection and mount mobile computing device 230 as a removable mass storage device. After authenticating the user as necessary, hypervisor 210 may then begin searching storage medium 245 of mobile computing device 230 to identify any available virtual machine images. Upon detection of virtual machine image 247, hypervisor 210 may receive the image as virtual machine image 222 over interface 217, 235.

When the transfer of virtual machine image 222 is complete, client computing device 200 may then begin executing the guest OS 207 contained in the virtual machine image, now loaded in memory as virtual machine 205. Once running, guest OS 207 may request virtual resources from Type 1 hypervisor 210, which, in response to such requests, may allocate physical resources available in hardware 215, such as memory, processors, and storage.

Furthermore, in order to transmit or receive network data 224, guest OS 207 may communicate with a virtual network driver 220 running on client computing device 200. Virtual network driver 220 may virtualize the network hardware 240 of mobile computing device 230. In this manner, guest OS 207 may transmit and receive network data using network hardware 240 as if a physical network card were installed in client computing device 200.

As illustrated, the virtual network driver 220 may be located in one of a number of locations. The process for initializing driver 220 may vary depending on its location. For example, when virtual network driver 220 is located in hypervisor 210, driver 220 may be initialized immediately after hypervisor 210 initializes and prior to initializing virtual machine 205. In such embodiments, driver 220 may be utilized to transmit network data 224 using interfaces 217, 235 as soon as the driver 220 is loaded within hypervisor 210. Alternatively, when virtual network driver 220 is located in guest OS 207, driver 220 may be initialized once virtual machine 205 is running within hypervisor 210.

After hypervisor 210, guest OS 207, and virtual network driver 220 are all initialized, client computing device 200 may begin exchanging network data 224 between guest OS 207 and mobile computing device 230 to thereby utilize the Internet access available to mobile computing device 230. In particular, once loaded, virtual network driver 220 may control transmission of network data 224 to and from mobile computing device 230 between interfaces 217, 235. For example, to transmit data, guest OS 207 may first provide the network data to driver 220. In response, driver 220 may transmit the network data 224 between interface 217 and interface 235 and, upon receipt of the network data, mobile computing device 230 may transmit the data using network hardware 240. Conversely, upon receipt of data in network hardware 240, driver 220 may read the network data 224 from interface 235 to interface 217 and provide the data to hypervisor 210. In response, hypervisor 210 may identify the intended recipient of network data 224 and, when the recipient is guest OS 207, provide the data 224 to guest OS 207.

Mobile computing device 230 may be, for example, a mobile phone, a tablet computing device, a wireless email device, a notebook computer, or any other portable computing device with access to the Internet that can be shared with computing device 200. As illustrated, mobile computing device 230 may include an interface 235, network hardware 240, a storage medium 245, and a virtual machine image 247.

As with interface 115 of FIG. 1, interface 235 may include electronic components for wired or wireless communication with client computing device 200. As described above, interface 235 may be in communication with a corresponding interface 217 of client computing device 200 to transmit virtual machine image 222 and to exchange network data 224. Network hardware 240 may be, for example, a wireless transceiver capable of providing Internet access via a connection with a cellular or other wireless network. As described above, network hardware 240 may be used to transmit and receive network data 224 on behalf of client computing device 200. Finally, storage medium 245 may be configured similarly to storage medium 120 of FIG. 1 and may therefore be any hardware device capable of storing a virtual machine image 247.

Virtual machine image 247 may be initially stored in storage medium 245 in a number of ways. For example, in some embodiments, the user may manually upload virtual machine image 247 to the storage medium 245 by coupling interface 235 to an interface of another computing device that stores image 247. As another example, virtual machine image 247 may be downloaded by an application executing on mobile device 230, For example, a user may execute an application that connects to a database containing virtual machine images and use the application to select and download a particular virtual machine image 247 to storage medium 245. Regardless of the technique used for storing image 247, the image 247 may be provided to client computing device 200 for execution, as described above.

Figure 2B:
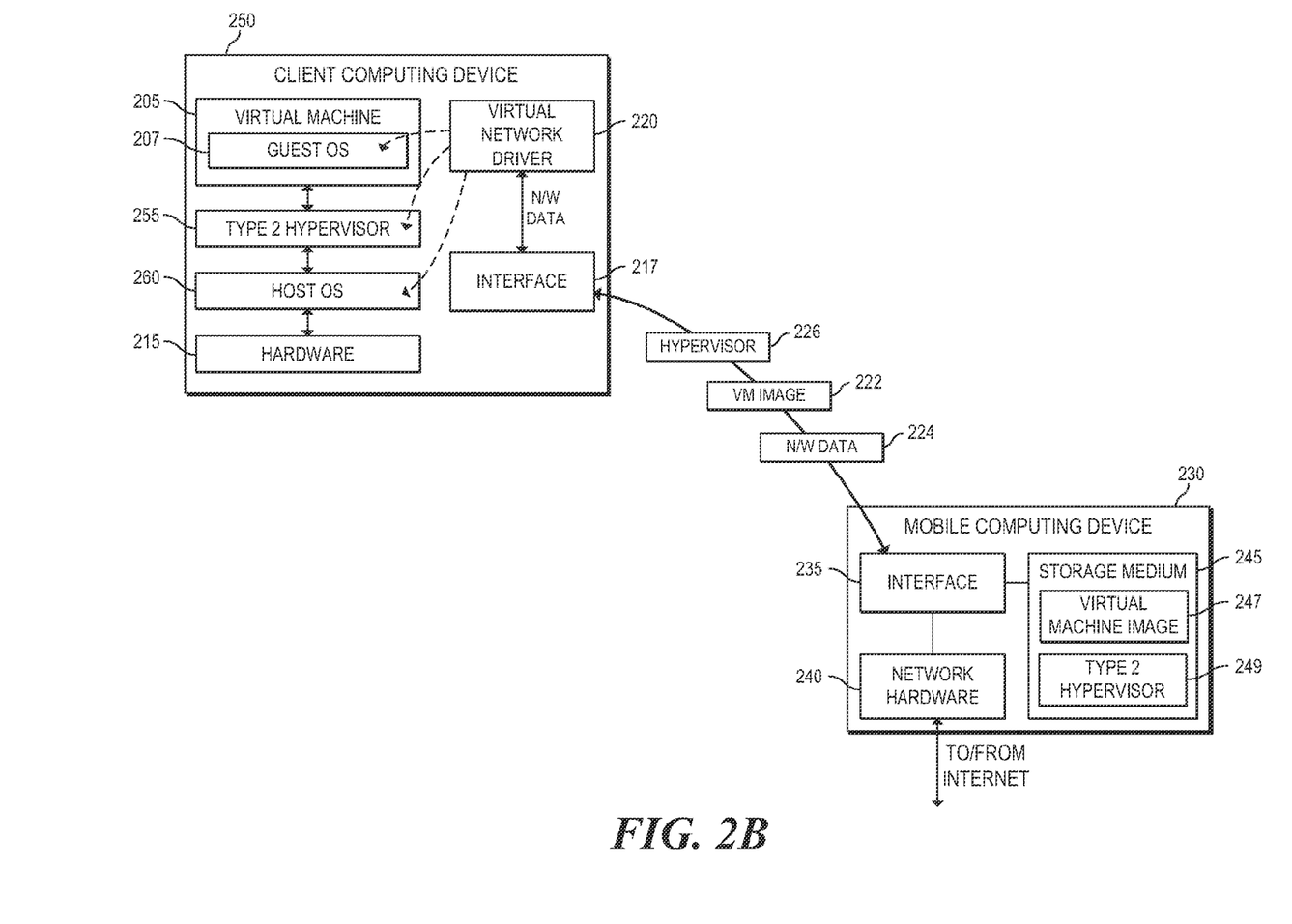
FIG. 2B is a block diagram of an example client computing device executing a Type 2 hypervisor and sharing Internet access available to a coupled mobile computing device.

FIG. 2B is a block diagram of an example client computing device 250 executing a Type 2 hypervisor 255 and sharing Internet access available to a coupled mobile computing device 230. As detailed below, client computing device 250 may be in communication with mobile computing device 230 for receiving a virtual image 222 and hypervisor 226 and for exchanging network data 224.

In contrast to the arrangement of FIG. 2A, client computing device 250 includes a Type 2 hypervisor 255, rather than a Type 1 hypervisor. Because hypervisor 255 is of "Type 2," hypervisor 255 runs within host operating system 260 and therefore fulfills requests for resources from guest OS 207 by communicating with host operating system 260, rather than directly with hardware 215.

In addition, as illustrated, storage medium 245 of mobile computing device 230 may also maintain an image of Type 2 hypervisor 249. In such embodiments, client computing device 250 may receive Type 2 hypervisor 249 from mobile computing device 230 based on a transfer of the hypervisor 226 between interface 235 and interface 217. In this manner, client computing device 250 may obtain and execute Type 2 hypervisor 255 even when the client computing device 250 does not include a native hypervisor. It should be noted, however, that, as with Type 1 hypervisor 210, Type 2 hypervisor 255 may also be maintained on a local storage medium of client computing device 250, such that Type 2 hypervisor 255 is loaded into memory from the local storage medium.

As with the implementation of FIG. 2A, virtual network driver 220 may be included in either guest OS 207 or hypervisor 255. In addition, virtual network driver 220 may instead be included in host OS 260. In such embodiments, host OS 260 may be initialized during a boot procedure of client computing device 250 and virtual network driver 260 may be loaded and initialized while host OS 260 is initialized. Regardless of its location, the loaded virtual network driver 220 may operate in the manner described above in connection with FIG. 2A.

Figure 3:
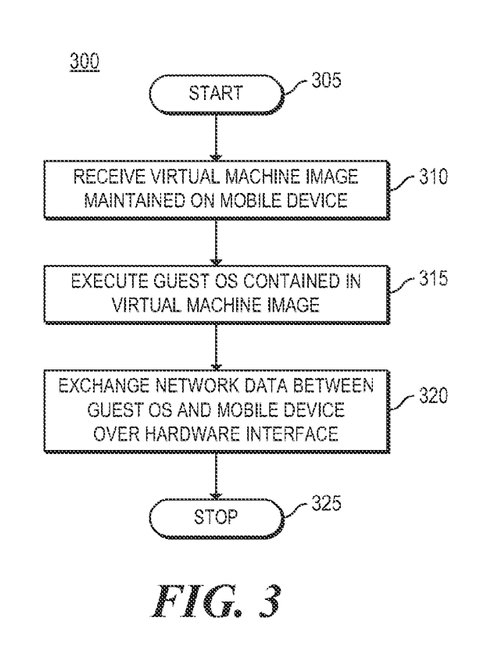
FIG. 3 is a flowchart of an example method for sharing Internet access available to a mobile computing device with a client computing device.

FIG. 3 is a flowchart of an example method 300 for sharing Internet access available to a mobile computing device with a client computing device 100. Although execution of method 300 is described below with reference to computing device 100, other suitable devices for execution of method 300 will be apparent to those of skill the art (e.g., computing devices 200, 250). Method 300 may be implemented in the form of executable instructions stored on a machine-readable storage medium, such as storage medium 120, and/or in the form of electronic circuitry.

Method 300 starts in block 305 and continues to block 310, where computing device 100 may receive a virtual machine image from a storage medium of a mobile computing device. For example, computing device 100 may receive the virtual machine image from a storage device of the mobile device over interface 115.

In block 315, computing device 100 may then execute a guest operating system contained in the virtual machine image received in block 310. Once executing, the guest OS may communicate with a hypervisor executing on computing device 100. For example, the guest OS may provide resource requests to the hypervisor, which, in return, may allocate hardware resources to the guest OS.

Finally, in block 320, after the guest OS has been retrieved and loaded, computing device 100 may transfer network data between the guest OS and the mobile device over the hardware interface 115. For example, a virtual network driver running in computing device 100 may serve as an intermediary between the guest OS and the network hardware of the mobile computing device. In this manner, computing device 100 may utilize the Internet access available to the mobile computing device via the guest OS. Method 300 may then proceed to block 325, where method 300 may stop.

Figure 4A:
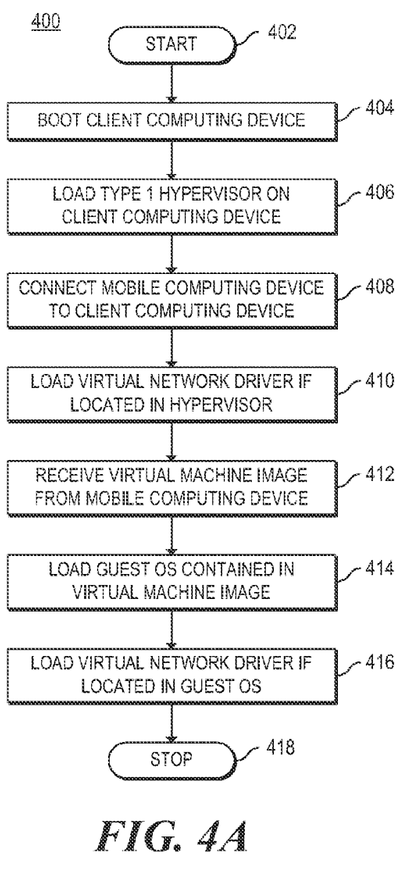
FIG. 4A is a flowchart of an example method for initializing a client computing device including a Type 1 hypervisor to share Internet access available to a mobile computing device.
Figure 4B:
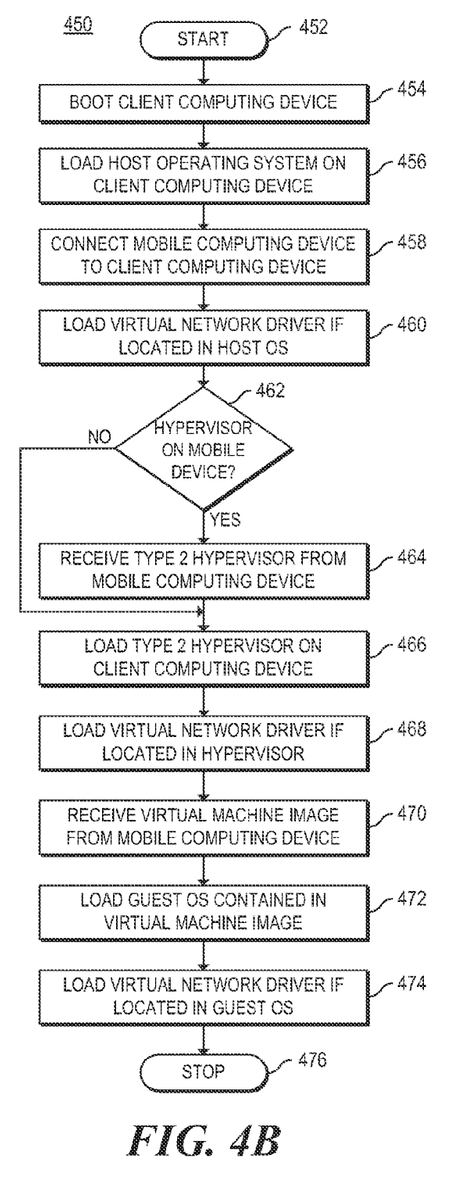
FIG. 4B is a flowchart of an example method for initializing a client computing device including a Type 2 hypervisor to share Internet access available to a mobile computing device.

FIGS. 4A and 4B are flowcharts of two example methods for initializing client computing devices 200, 250 to execute a hypervisor. Although execution of methods 400, 450 is described below with reference to the components of computing devices 200, 250, respectively, other suitable components for execution of methods 400, 450 will be apparent to those of skill in the art. Methods 400, 450 may be implemented in the form of executable instructions stored on a machine-readable storage medium and/or in the form of electronic circuitry.

FIG. 4A is a flowchart of an example method 400 for initializing a client computing device 200 including a Type 1 hypervisor 210 to share Internet access available to a mobile computing device 230. Method 400 starts in block 402 and continues to block 404, where a user boots client computing device 200 by, for example, activating a power button of the device.

In block 406, client computing device 200 begins loading Type 1 hypervisor 210. For example, client computing device 200 may access a local storage medium including hypervisor 210 and load hypervisor 210 into memory. Client computing device 200 may then begin execution of hypervisor 210.

In block 408, client computing device 200 is connected to mobile computing device 230. For example, a user may attach a USB, eSATA, Firewire, or other cable between interface 217 and interface 235. Alternatively, the user may establish a wireless connection between devices 200, 230 by, for example, connecting both devices through Bluetooth or another wireless connection.

In block 410, if virtual network driver 220 is to be located in hypervisor 210, client computing device 200 may then initialize virtual network driver 220. Once initialized in hypervisor 210, virtual network driver 220 is ready to exchange network data with network hardware 240 using interfaces 217, 235. Network hardware 240 may, in turn, control transmission of data to and from the Internet.

Next, in block 412, client computing device 200 may receive virtual machine image 247 from mobile computing device 230. For example, hypervisor 210 may detect the connection between interfaces 217, 235, locate virtual machine image 247 on storage medium 245, and initiate transmission of the image 247 between the interfaces 217, 235. In block 414, after client computing device 200 receives image 247, client computing device 200 may initialize virtual machine 205 and load guest OS 207.

Finally, in block 416, if virtual network driver 220 is to be located in guest OS 207 (i.e., it is not located in hypervisor 210), client computing device 200 may then initialize virtual network driver 220 within guest OS 207. Once initialized in guest OS 207, virtual network driver 220 is ready to exchange network data with network hardware 240 using interfaces 217, 235. Method 400 may then proceed to block 418, where method 400 stops.

FIG. 4B is a flowchart of an example method 450 for initializing a client computing device 250 including a Type 2 hypervisor 255 to share Internet access available to a mobile computing device 230. Method 450 starts in block 452 and proceeds to block 454, where a user boots client computing device 250.

In block 456, client computing device 250 begins loading host operating system 260. For example, client computing device 250 may access a local storage medium including host OS 260 and may then load host OS 260 into memory. Client computing device 250 may then begin execution of host OS 260.

In block 458, client computing device 250 is connected to mobile computing device 230 via a wired or wireless interface. For example, the interface may be a USB cable, eSATA cable, Firewire cable, or a wireless connection. Next, in block 460, if virtual network driver 220 is to be located in host OS 260, host OS 260 may then initialize virtual network driver 220. After driver 220 is initialized, driver 220 may then be prepared to transmit data to and from mobile computing device 230 between interfaces 217, 235.

In block 462, client computing device 250 determines whether the hypervisor is to be loaded from a local storage device or from mobile computing device 230. For example, mobile computing device 230 may determine whether a hypervisor is present on a local storage device and, if not, method 450 may proceed to block 464, where computing device 250 may attempt to locate a Type 2 hypervisor 249 maintained on a storage medium 245 of mobile computing device 230. When such a hypervisor 249 is located, client computing device 250 may then retrieve Type 2 hypervisor 249 over the connection between interface 235 and interface 217.

In block 466, computing device 250 may load Type 2 hypervisor 255 as retrieved from a local storage medium or from mobile computing device 230. For example, computing device 250 may load Type 2 hypervisor 255 into memory and begin execution of Type 2 hypervisor 255 within host OS 260.

Next, in block 468, if virtual network driver 220 is to be located in hypervisor 255, client computing device 250 may then initialize virtual network driver 220. Once initialized in hypervisor 255, virtual network driver 220 is ready to exchange network data with network hardware 240 using interfaces 217, 235. Network hardware 240 may, in turn, control transmission of data to and from the Internet.

Next, in block 470, client computing device 250 may receive virtual machine image 247 from mobile computing device 230. For example, hypervisor 255 may detect the connection between interfaces 217, 235, locate virtual machine image 247 on storage medium 245, and initiate transmission of the image 247 between interfaces 217, 235. In block 472, after client computing device 250 receives image 247, client computing device 250 may initialize virtual machine 205, load guest OS 207 into memory, and begin execution of guest OS 207.

Finally, in block 474, if virtual network driver 220 is to be located in guest OS 207 (i.e., it is not located in host OS 260 or hypervisor 255), client computing device 250 may then initialize virtual network driver 220 within guest OS 207. Once initialized in guest OS 207, virtual network driver 220 is ready to exchange network data with network hardware 240 using interfaces 217, 235. Method 400 may then proceed to block 476, where method 450 stops.

Figure 5A:
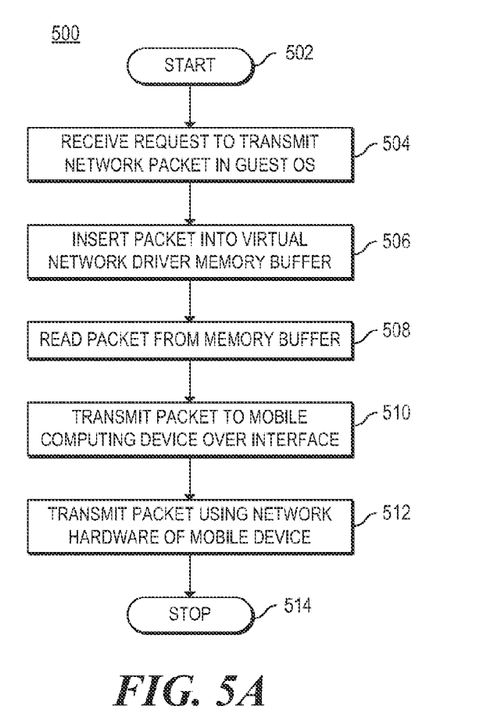
FIG. 5A is a flowchart of an example method for transmitting packets generated in a guest OS of a client computing device using a virtual network driver.
Figure 5B:
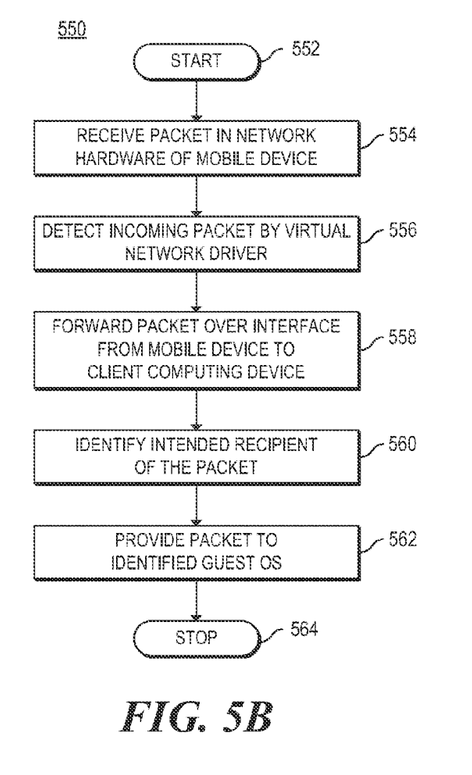
FIG. 5B is a flowchart of an example method for receiving packets intended for a guest OS of a client computing device using a virtual network driver.

FIGS. 5A and 5B are flowcharts of example methods for utilizing a virtual network driver 220 to send and receive network data, respectively. Although execution of methods 500, 550 is described below with reference to the components of computing devices 200, 250, respectively, other suitable components for execution of methods 500, 550 will be apparent to those of skill in the art Methods 500, 550 may be implemented in the form of executable instructions stored on a machine-readable storage medium and/or in the form of electronic circuitry.

FIG. 5A is a flowchart of an example method 500 for transmitting packets generated in a guest OS 207 of a client computing device 200, 250 using a virtual network driver 220. Method 500 starts in block 502 and proceeds to block 504, where computing device 200, 250 may receive a request to transmit a network packet originating in the guest OS 207 executing within a hypervisor 210, 255. For example, an application or other process executing in guest OS 207 may seek to transmit a packet to a specified Internet Protocol (IP) address on the Internet.

As detailed above, the virtual network driver 220 may be placed in either the guest OS 207, the hypervisor 210, 255, or the host OS 260. Depending on the location of driver 220, in block 506, the guest OS 207, hypervisor 210, 255, or host OS 260 may insert the network packet into a memory buffer monitored by driver 220. In operation, virtual network driver 220 monitors the memory buffer for insertion of packets and reads packets from the buffer using a given processing technique (e.g., first in, first out). Accordingly, in block 508, virtual network driver 220 reads the inserted packet from the memory buffer. In block 510, after reading the packet, virtual network driver 220 transmits the packet over the connection between interfaces 217, 235. Finally, in block 512, upon receipt of the packet in interface 235, mobile computing device 230 transmits the packet to the intended destination using network hardware 240. Method 500 then proceeds to block 514, where method 500 stops.

FIG. 5B is a flowchart of an example method 550 for receiving packets intended for a guest OS 207 of a client computing device 200, 250 using a virtual network driver 220. Method 550 starts in block 552 and proceeds to block 554, where network hardware 240 of mobile computing device 230 receives an incoming packet from a source external to mobile computing device 230.

In block 556, virtual network driver 220 detects the incoming packet and, in block 558, forwards the packet over the connection between interface 235 and interface 217. In block 560, hypervisor 210, 255 executing in computing device 200, 250 then detects the incoming packet and identifies the virtual machine 205 for receipt of the packet. For example, if multiple virtual machines are executing within hypervisor 210, 255, the hypervisor may identify the intended recipient of the packet based, for example, on the destination IP address of the packet. In block 562, after identifying the intended recipient, hypervisor 210, 255 may forward the packet to the appropriate virtual machine and, in particular, the guest OS 207 executing within the virtual machine. Finally, method 550 may proceed to block 564, where method 550 may stop.

According to the foregoing, example embodiments disclosed herein allow a user to access a customized virtual machine image maintained on a mobile computing device. In this manner, a user may easily transport a customized environment and access this environment from a client device. Furthermore, by virtualizing the network hardware available on the mobile device, example embodiments also allow for Internet access on the client, even when the client lacks native networking capabilities.

We claim:

1. A client computing device for sharing Internet access available to a mobile computing device, the client computing device comprising:
   an interface for communication with the mobile computing device; and
   a processor to:
      receive a virtual machine image maintained on a storage device of the mobile computing device over the interface,
      execute a guest operating system (OS) contained in the virtual machine image, the guest OS providing requests to a hypervisor loaded in the client computing device, and
      exchange network data between the guest OS and the mobile computing device over the interface to enable the client computing device to utilize the Internet access available to the mobile computing device, wherein:

the guest OS exchanges the network data with a virtual network driver that virtualizes network hardware contained in the mobile computing device; and the virtual network driver controls transmission of the network data to and from the mobile computing device over the interface.

2. The client computing device of claim 1, wherein the hypervisor loaded in the client computing device automatically detects a connection over the interface between the client computing device and the mobile computing device prior to receiving the virtual machine image.

3. The client computing device of claim 1, wherein, to load the hypervisor in the client computing device, the processor is to receive the hypervisor over the interface from the storage device of the mobile computing device.

4. The client computing device of claim 1, wherein to load the hypervisor in the client computing device, the processor is to retrieve the hypervisor from a local storage device of the client computing device.

5. The client computing device of claim 1, wherein the virtual network driver is maintained in a host operating system of the client computing device, the hypervisor, or the virtual machine image.

6. The client computing device of claim 1, wherein the Internet access available to the mobile computing device is provided via a connection with a cellular network.

7. The client computing device of claim 1, wherein the client computing device lacks native networking capabilities to access the Internet.

8. A non-transitory machine-readable storage medium encoded with instructions executable by a processor of a client computing device for sharing Internet access available to a mobile computing device, the machine-readable storage medium comprising:
instructions for loading a hypervisor on the client computing device;
instructions for receiving, in the hypervisor, a virtual machine image maintained on a storage device of the mobile computing device;
instructions for loading a guest operating system (OS) contained in the virtual machine image, the guest OS communicating with the hypervisor; and
instructions for initializing a virtual network driver to virtualize network hardware in the mobile computing device, the initialized driver exchanging network data between the guest OS and the network hardware of the mobile computing device to enable the client computing device to utilize the Internet access available to the mobile computing device.

9. The non-transitory machine-readable storage medium of claim 8, wherein the instructions for loading the hypervisor receive the hypervisor from the storage device of the mobile computing device.

10. The non-transitory machine-readable storage medium of claim 8, wherein the virtual network driver executes in a host operating system of the client computing device, the hypervisor, or the guest OS.

11. The non-transitory machine-readable storage medium of claim 8, wherein the virtual network driver comprises:
instructions for transmitting network data originating in the guest OS over an interface from the client computing device to the mobile computing device; and
instructions for receiving network data intended for the guest OS over the interface from the mobile computing device to the client computing device.

12. A method for sharing Internet access available to a mobile computing device with a client computing device, the method comprising:
receiving a virtual machine image maintained on a storage device of the mobile computing device over an interface between the client computing device and the mobile computing device;
executing a guest operating system (OS) contained in the virtual machine image, the guest OS communicating with a hypervisor loaded in the client computing device; and
utilizing the Internet access available to the mobile computing device by transferring network data between the guest OS and the mobile computing device over the interface, wherein utilizing includes using a virtual network driver that virtualizes network hardware contained in the mobile computing device to transmit network data to and from the guest OS.

13. The method of claim 12, further comprising:
loading the hypervisor from the storage device of the mobile computing device over the interface between the client computing device and the mobile computing device.

14. The method of claim 12, wherein the virtual network driver is maintained in a host operating system of the client computing device, the hypervisor, or the virtual machine image.

* * * * *